(12) United States Patent
Nanba et al.

(10) Patent No.: US 10,316,174 B2
(45) Date of Patent: Jun. 11, 2019

(54) GOLF BALL MATERIAL AND GOLF BALL

(71) Applicant: Bridgestone Sports Co., Ltd., Minato-ku, Tokyo (JP)

(72) Inventors: Atsushi Nanba, Chichibushi (JP); Takanori Tago, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 11 days.

(21) Appl. No.: 15/471,780

(22) Filed: Mar. 28, 2017

(65) Prior Publication Data

US 2017/0260377 A1    Sep. 14, 2017

Related U.S. Application Data

(63) Continuation-in-part of application No. 14/714,877, filed on May 18, 2015, now Pat. No. 9,637,625.

(30) Foreign Application Priority Data

Jun. 24, 2014    (JP) .................................. 2014-129071

(51) Int. Cl.
| | | |
|---|---|---|
| A63B 37/12 | (2006.01) |
| C08L 23/08 | (2006.01) |
| C08L 77/00 | (2006.01) |
| A63B 37/00 | (2006.01) |

(52) U.S. Cl.
CPC ...... *C08L 23/0876* (2013.01); *A63B 37/0024* (2013.01); *A63B 37/0051* (2013.01); *A63B 37/0059* (2013.01); *A63B 37/0074* (2013.01); *A63B 37/0075* (2013.01); *A63B 37/0076* (2013.01); *C08L 2205/03* (2013.01); *C08L 2205/08* (2013.01)

(58) Field of Classification Search
None
See application file for complete search history.

(56) References Cited

U.S. PATENT DOCUMENTS

| 5,889,114 A | 3/1999 | Statz |
| 5,977,264 A | 11/1999 | Ichikawa et al. |
| 6,037,419 A | 3/2000 | Takesue et al. |
| 6,063,869 A | 5/2000 | Kashiwagi et al. |
| 6,268,437 B1 | 7/2001 | Takesue et al. |
| 6,274,669 B1 | 8/2001 | Rajagopalan |
| 6,407,176 B1 * | 6/2002 | Sullivan ............. A63B 37/0003 525/221 |
| 7,090,799 B2 | 8/2006 | Takesue et al. |
| 2004/0236030 A1 * | 11/2004 | Kim .......................... C08F 8/32 525/329.9 |
| 2009/0264591 A1 | 10/2009 | Sano et al. |
| 2015/0368452 A1 * | 12/2015 | Nanba ..................... C08L 23/00 525/221 |

FOREIGN PATENT DOCUMENTS

| GB | 2278364 A | 11/1994 |
| JP | S56-083367 | 7/1981 |
| JP | 60-80469 A | 5/1985 |
| JP | 60-145160 A | 7/1985 |
| JP | 62-275480 A | 11/1987 |
| JP | 64-32878 A | 2/1989 |
| JP | 4-126168 A | 4/1992 |
| JP | 6-327794 A | 11/1994 |
| JP | 10-127822 | 5/1998 |
| JP | 10-137363 | 5/1998 |
| JP | 11-276638 A | 10/1999 |
| JP | H11-299933 | 11/1999 |
| JP | 2005-253962 | 9/2005 |
| JP | 2017-008201 A | 1/2017 |
| JP | 2017008201 * | 1/2017 |
| WO | WO 97/31956 * | 9/1997 |

* cited by examiner

*Primary Examiner* — David J Buttner
(74) *Attorney, Agent, or Firm* — Sughrue Mion, PLLC

(57) ABSTRACT

A golf ball material includes (A) one or more resin ingredient selected from the group consisting of olefin-unsaturated carboxylic acid random copolymers, olefin-unsaturated carboxylic acid-unsaturated carboxylic acid ester random copolymers, and metal ion neutralization products of these copolymers; (D) an amino compound having at least 2 amino groups per molecule; (B) one or more resin ingredient selected from the group consisting of polyethylene, polyesters and polyamide elastomers; and (C) an agent for compatibilizing components (A) and (B). The compatibilizing agent (C) includes: (C-i) two different types of base polymer selected from a specific group, (C-ii) a hydrogenated diene polymer having at least one type of functional moiety selected from a specific group of moieties, and (C-iii) an olefinic polymer having at least one type of functional moiety selected from a specific group of moieties.

5 Claims, No Drawings

GOLF BALL MATERIAL AND GOLF BALL

CROSS-REFERENCE TO RELATED APPLICATION

This application is a continuation-in-part of application Ser. No. 14/714,877 filed on May 18, 2015, now U.S. Pat. No. 9,637,625 the entire contents of which are hereby incorporated by reference.

BACKGROUND OF THE INVENTION

The present invention relates to a golf ball material, and more particularly to a golf ball material that can be suitably used as the material forming a constituent part of the core and/or cover of a golf ball composed of a core of one or more layer and a cover of one or more layer.

Ionomer resins have hitherto been widely used as the cover material in golf balls. However, owing to the constant desire by users for golf balls endowed with a high rebound and a high durability, a variety of improvements are being carried out on such ionomer-based resins. In addition, innovations that entail mixing a low-cost resin such as polyethylene or ethylene-vinyl acetate copolymer (EVA) with an ionomer-based resin material have also been proposed in order to reduce costs.

One example is a golf ball that uses as the cover material an ionomer blend obtained by mixing a small amount of a medium- or low-density polyethylene with an ionomer-based resin (JP-A S60-145160). In addition. JP-A S60-80469, JP-A H01-32878, JP-A 1-104-126168 and JP-A H06-327794 describe, as golf ball materials, compositions obtained by blending an ethylene-vinyl acetate copolymer (EVA) with an ionomer-based resin. However, in all of these golf ball materials, the compatibility between the ionomer and these various types of polyolefins is poor, which has presented a problem in terms of the durability of the golf ball.

JP-A H11-276638 discloses that, by introducing a graft copolymer in which some or all of an ethylene copolymer has been graft-modified with an unsaturated dicarboxylic anhydride, the compatibility between the ionomer and the ethylene copolymer is improved, enhancing the durability of golf ball covers formed of such polymer compositions. However, a sufficient durability has not been achieved.

In addition, because the durability markedly declines when a low-cost resin such as polyethylene or ethylene-vinyl acetate copolymer (EVA) is mixed with an ionomer resin, art that improves the durability by adding and kneading an organic peroxide into this polymer alloy has been proposed. However, carrying out such a kneading operation takes time and effort. Moreover, in terms of the golf ball manufacturing operations, in cases where a compatibilizing agent is to be added to a polymer composition of an ionomer with a polyethylene, the polymer composition must first be subjected to a compounding step in an extruder, which takes a good deal of time and effort.

Golf balls that use an ionomer resin in the cover material have an excellent ball rebound, but fall short in terms of durability and flexibility. In order to compensate for this shortcoming, JP-A S56-83367 and JP-A S62-275480 disclose polymer blends of a polyester block copolymer that is flexible and has excellent resilience mixed together with an ionomer resin that has excellent resilience. This approach takes advantage of the good qualities of both resins, and is particularly effective in achieving both a good rebound performance and a good flexibility. However, because the compatibility between the polyester block copolymer and the ionomer in this mixture is poor, when such a mixture is used as a golf ball cover material, the ball lacks a sufficient durability to repeated impact.

JP-A 2005-253962 describes a mixture of an ionomer resin with a polyester elastomer in which the above problem of compatibility is ameliorated by adding an isocyanate to the mixture. As a result, a scuff resistance improving effect is obtained, but the durability to repeated impact remains a concern. The same publication indicates that, for mixtures of ionomer resins and polyamide elastomers as well, adding an isocyanate improves the compatibility and has a scuff resistance enhancing effect. However, here too, the durability to repeated impact remains a concern.

A variety of ionomer materials endowed with a high resilience and a high hardness have been proposed in order to obtain golf balls of excellent feel at impact, rebound and flight properties. For example, JP-A H10-127822, JP-A H10-137363, JP-A H10-137364, JP-A H11-299933 and JP-A 2017-8201 describe modified ionomer materials which are ionomers modified by the addition of amine compounds. However, all of these have the drawback of an inadequate durability to repeated impact.

SUMMARY OF THE INVENTION

It is therefore an object of the invention to provide a golf ball composition made up primarily of an ionomer resin, which composition enhances the simplicity of the golf ball manufacturing operations and improves the durability and rebound performance of the resulting golf balls.

We have discovered that by adding, to a composition containing:

(A) one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers, (D) an amine compound containing at least two amino groups per molecule, and (B) one, two or more resin ingredients selected from the group consisting of polyethylene, polyesters and polyamide elastomers, a compatibilizing agent containing:

(C-i) two different types of base polymer selected from the respective groups in components (A) and (B) above, (C-ii) a hydrogenated diene polymer having at least one type of functional moiety selected from the group consisting of carboxyl, acid anhydride, (meth)acryloyl, amino, alkoxysilyl, hydroxyl, isocyanato and oxazoline moieties, and (C-iii) an olefinic polymer having at least one type of functional moiety selected from the group consisting of carboxyl, acid anhydride, epoxy, (meth)acryloyl, amino, alkoxysilyl, hydroxyl, isocyanato and oxazoline moieties, there is no need for a compounding step in a mixer such as an extruder, Banbury mixer or kneader, and that, after injection-molding or film insert-molding a dry blend of pellets alone, compatibilization is achieved and sufficient durability and rebound can be obtained.

Accordingly, the invention provides the following golf ball material and golf ball.

[1] A golf ball material comprising (A) one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers;

(D) an amino compound having at least 2 amino groups per molecule;

(B) one, two or more resin ingredients selected from the group consisting of polyethylene, polyesters and polyamide elastomers; and (C) an agent for compatibilizing components (A) and (B), wherein the compatibilizing agent (C) comprises:

(C-i) two different types of base polymer selected from the respective groups in components (A) and (B), (C-ii) a hydrogenated diene polymer having at least one type of functional moiety selected from the group consisting of carboxyl, acid anhydride, (meth)acryloyl, amino, alkoxysilyl, hydroxyl, isocyanato and oxazoline moieties, and (C-iii) an olefinic polymer having at least one type of functional moiety selected from the group consisting of carboxyl, acid anhydride, epoxy, (meth)acryloyl, amino, alkoxysilyl, hydroxyl, isocyanato and oxazoline moieties.

[2] The golf ball material of [1], wherein component (D) is kneaded with the resin ingredient of component (A) so as to obtain beforehand a component (D)-modified resin ingredient (A).

[3] The golf ball material of [1], wherein component (D) is added in an amount of from 0.01 to 1 equivalent per mole equivalent of the carboxyl groups in component (A).

[4] The golf ball material of [1], wherein components (A) and (B) are included in a weight ratio therebetween of from 99:1 to 30:70.

[5] The golf ball material of [1], wherein the content of component (C) is from 2 to 15 parts by weight per 100 parts by weight of the combined amount of components (A) and (B).

[6] The golf ball material of [1], wherein the base polymer of component (C-i) consists of a combination of a polyethylene and a polyester.

[7] The golf ball material of [6], wherein the polyester is polyethylene terephthalate.

[8] A golf ball comprising a core of one or more layer and a cover of one or more layer, wherein at least one constituent part of the core or the cover or both is made of the golf ball material of [1].

DETAILED DESCRIPTION OF THE INVENTION

The invention is described more specifically below.

The golf ball material of the invention is a material which includes above components (A) to (C). The material uses, as component (A), one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers.

The olefin used in component (A) has preferably from 2 to 6 carbon atoms; ethylene is especially preferred. The unsaturated carboxylic acid used in component A has preferably from 3 to 8 carbon atoms; for example, acrylic acid or methacrylic acid may be used. The unsaturated carboxylic acid ester used in component (A), although not particularly limited, is preferably a lower alkyl ester. Butyl acrylate (n-butyl acrylate, i-butyl acrylate) is especially preferred.

The content of unsaturated carboxylic acid (acid content) in component (A), although not particularly limited, is preferably at least 2 wt % but not more than 20 wt %, and more preferably at least 4 wt % but not more than 15 wt %. At an acid content lower than this range, moldings of the golf ball material may not achieve the desired rebound. On the other hand, if the acid content is too high, the hardness may become extremely high, which may adversely affect the durability.

In component (A), an olefin-unsaturated carboxylic acid random copolymer or an olefin-unsaturated carboxylic acid-unsaturated carboxylic acid ester random copolymer (un-neutralized form) may be used together with a metal ion neutralization product of an olefin-unsaturated carboxylic acid random copolymer or a metal ion neutralization product of an olefin-unsaturated carboxylic acid-unsaturated carboxylic acid ester random copolymer. The mixing ratios of the un-neutralized forms (I) of the copolymers with the metal neutralization products (II) of the copolymers are not particularly limited.

In cases where metal neutralization products (ionomers) of the above copolymers are used as component (A), the type of metal neutralization product and its degree of neutralization are not subject to any particular limitation. Specific examples include 60 mol % Zn (degree of neutralization with zinc) ethylene: methacrylic acid copolymers, 40 mol % Mg (degree of neutralization with magnesium) ethylene-methacrylic acid copolymers, and 40 mol % Mg (degree of neutralization with magnesium) ethylene-methacrylic acid-isobutylene acrylate terpolymers.

Illustrative examples of commercial products that may be used as component (A) include the Nucrel series (DuPont-Mitsui Polychemicals Co., Ltd.), the Himilan series (DuPont-Mitsui Polychemicals Co., Ltd.), the Surlyn series and HPF series (E.I. DuPont de Nemours & Co.), and the Escor series (ExxonMobil Chemical).

Next, one, two or more resin ingredients selected from the group consisting of polyethylene, polyesters and polyamide elastomers are used as component (B).

When a polyethylene is used as component (B), the polyethylene may be of any type. Illustrative examples include low-density polyethylenes polymerized by a high-pressure process, and high-density polyethylenes polymerized by a medium- or low-pressure process. The specific gravity of the low-density polyethylene is typically from 0.90 to 0.94, and the specific gravity of the high-density polyethylene is typically from 0.95 to 0.97.

As used herein, "high-pressure process" refers to a process that involves adding a very small amount of air to purified ethylene under an applied pressure of 600 to 1,000 atmospheres and heating at about 200° C. to effect polymerization. "Medium-pressure process" refers to a process that entails applying a pressure of about 20 to 30 atmospheres to ethylene and, using a catalyst such as chromium, heating at about 150° C. to effect polymerization. "Low-pressure process" refers to a process in which polymerization is carried out using a catalyst of titanium tetrachloride and triethylaluminum and at a pressure of from normal pressure to about 5 atmospheres and a temperature of from normal temperature to 70° C.

In the case of polyethylenes produced by a high-pressure process, because the ethylene monomer is forcibly bonded at high temperature and pressure during polymerization, branching side chains arise here and there. Crystallization of the polyethylene is hindered by these side chains, and so the polyethylene exhibits a low hardness.

On the other hand, in the case of polyethylenes produced by a medium- or low-pressure process, because a catalyst is added to the ethylene monomer and polymerization is carried out at a low pressure, a polyethylene with little branching is obtained. Accordingly, because polyethylene produced by a medium- or low-pressure process has little branching, the molecules gather together tightly in an orderly arrangement, resulting in a high rigidity.

Because low-density polyethylenes and high-density polyethylenes thus have different hardnesses and densities, it is possible to add to the ionomer resin a polyethylene that is suitable for the desired hardness and density of the cover material.

Examples of low-density polyethylenes that may be used in this invention include the low-density polyethylenes available under the trade names Petrothene 219, Petrothene 339, Petrothene 340 and Petrothene 342 from Tosoh Corporation, products of the "Sanwax" series from Sanyo Chemical industries, Ltd., and UBE Polyethylene J1019 from Ube-Maruzen Polyethylene Co., Ltd. High-density polyethylenes that may be used in the invention include those generally marketed as impact-resistant grades, examples of which are the high-density polyethylenes M6800 and M3800 available from Keiyo Polyethylene Co., Ltd.

In cases where a polyester is used as component (B), illustrative examples of the polyester include polyester elastomers and the following polycondensation products of a polycarboxylic acid (dicarboxylic acid) with a polyol (diol): polyethylene terephthalate, polytrimethylene terephthalate, polybutylene terephthalate, polyethylene naphthalate and polybutylene naphthalate. Illustrative examples of polyester elastomers include the Hytrel series (3046, G3548L, 4047, 4767, 5557, 6347, 7247, 2571, 2751) from DuPont-Toray Co., Ltd., the Pelprene series (P-30B, P-40B, P-40H, P-55B, P-70B, P-90B, P-150B, P-280B, E-450B, P-75M, P-150M, S-1001, S-2001, S-3001, S-6001, S-9001) from Toyobo Co., Ltd., and the Primalloy series (A1400, A1500, A1600, A1700, A1800, A1900) from Mitsubishi Chemical Corporation.

In cases where a polyamide elastomer is used as component (B), illustrative examples of the polyamide elastomer include the Daiamid series (E75K2, E62K2) from Daicel-Evonik Ltd., the Vestamid series (E58-4, N1901) from Daicel-Evonik Ltd., and the Pebax series (Rnew 25R53, Rnew 63R53, Rnew 72R53, 2533, 6333, 7233) from Arkema KK.

Components (A) and (B) are included in a weight ratio therebetween of preferably from 99:1 to 30:70, and more preferably from 97:3 to 50:50. Outside of this range, the durability to repeated impact may dramatically decline.

Next, component (C) of the invention, which is an agent for compatibilizing components A and B, is described.

The compatibilizing agent serving as component (C) includes components (C-i), (C-ii) and (C-iii) below.
Component (C-i)

Component (C-i) is two different types of base polymers selected from the respective groups in components (A) and (B) above. That is, component (C-i) is a base polymer consisting of a combination of two different types of resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, polyethylene, polyesters and polyamide elastomers. Preferred combinations of these base polymers are combinations of a polyethylene with a polyester. It is especially preferable to use a combination of polyethylene terephthalate as the polyester with polyethylene.
Component (C-ii)

Component (C-ii) is a hydrogenated diene polymer having at least one type of functional moiety selected from the group consisting of carboxyl, acid anhydride, (meth)acryloyl, amino, alkoxysilyl, hydroxyl, isocyanato and oxazoline moieties. As used herein, "hydrogenated diene polymer" refers to a polymer in which a conjugated diene polymer serves as the base polymer, functional moieties selected from the foregoing group have been introduced onto this base polymer, and at least 80% of the double bonds on the conjugated diene compound units making up the base polymer are hydrogenated.

Here, the conjugated diene polymer is a polymer containing recurring units from a conjugated diene compound. Illustrative examples include polymers containing recurring units from conjugated diene compounds such as 1,3-butadiene, isoprene, 2.3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene and chloroprene. In this invention, it is especially preferable to have a conjugated diene polymer containing recurring units from 1,3-butadiene or isoprene serve as the base polymer.
Component (C-iii)

Component (C-iii) is an olefinic polymer having at least one type of functional moiety selected from the group consisting of carboxyl, acid anhydride, epoxy, (meth)acryloyl, amino, alkoxysilyl, hydroxyl, isocyanato and oxazoline moieties. This olefinic polymer is a polymer in which an olefinic polymer serves as the base polymer and functional moieties selected from the foregoing group have been introduced onto this base polymer.

The olefinic polymer mentioned here is a polymer containing recurring units from an olefinic compound (that is, ethylene and/or an α-olefin). Illustrative examples of α-olefins include α-olefins having from 3 to 12 carbon atoms, such as propylene, 1-butene, 1-pentene, 3-methyl-1-butene, 1-hexene, 3-methyl-1-pentene, 4-methyl-1-pentene, 3-ethyl-1-pentene, 1-octene, 1-decene and 1-undecene. The olefinic polymer may include recurring units from compounds other than olefinic compounds.

The method of introducing functional moieties selected from the foregoing group onto this olefinic polymer is exemplified by a method that entails copolymerizing the olefinic compound with a monomer containing the functional moiety. For example, a polymer in which carboxyl groups have been introduced can be obtained by copolymerizing ethylene with (meth)acrylic acid, a polymer in which acid anhydride groups have been introduced can be obtained by copolymerizing ethylene with maleic anhydride, a polymer in which (meth)acryloyl groups have been introduced can be obtained by copolymerizing ethylene with a (meth)acryloyl group-containing compound, and a polymer in which epoxy groups have been introduced can be obtained by copolymerizing ethylene with an epoxy group-containing compound. The introduction of functional moieties is not limited to copolymerization, and may be carried out by graft polymerization or the like.

Illustrative examples of component (C-iii) include ethylene-(meth)acrylic acid copolymers, ionomers obtained by neutralizing some of the carboxyl groups on ethylene-(meth) acrylic acid copolymers with metallic ions such as sodium, zinc or magnesium, saponification products of ethylene-(meth)acrylate copolymers, ethylene-(meth)acryloyl copolymers, ethylene-(meth)acrylate-maleic anhydride copolymers, ethylene-vinyl isocyanate copolymers, maleic anhydride-modified polyethylenes, maleic anhydride-modified ethylene-propylene copolymers, ethylene-glycidyl methacrylate copolymers, epoxy-modified ethylene-propylene copolymers, hydroxyl-modified polyethylenes and hydroxyl-modified ethylene-propylene copolymers.

The content of component (C), although not particularly limited, is preferably from 2 to 15 parts by weight, and more preferably from 2 to 7 parts by weight, per 100 parts by weight of the combined amount of components (A) and (B). If this content is too low, components (A) and (B) do not sufficiently compatibilize, as a result of which the durability of the golf ball under repeated impact may markedly decline.

The golf ball material of the invention further includes, particularly in order to enhance resilience, component (D): an amine compound. This amine compound is exemplified by diamine compounds and polyamine compounds having at least 2 amino groups per molecule. Exemplary diamine compounds and polyamine compounds include aromatic diamines, alicyclic diamines, aliphatic diamines and acyclic aliphatic polyamines. These may be used singly or two or more may be used in combination.

Illustrative examples of the aromatic diamines include phenylenediamine and m-xylylenediamine. These may be used singly or two or more may be used in combination.

Some examples of the alicyclic diamines are saturated alicyclic diamines, including diaminocycloalkanes such as diaminocyclopentane, 1,4-diaminocyclohexane, 1,3-diaminocyclohexane, 1,2-diaminocyclohexane, diaminocycloheptane and hydrogenated naphthalenediamine; unsaturated alicyclic diamines such as 1,2-diaminocyclohexene and 1,3-diaminocyclohexene, hydrogenated diphenyldiamines, including 4,4'-diamino hydrogenated biphenyl and bis(aminocycloalkyl)alkanes such as bis(4-aminocyclohexyl)-methane, bis(4-amino-3-methylcyclohexyl)methane, bis(4-amino-2-methylcyclohexyl)-methane and 2,2-bis(4-aminocyclohexyl)propane, bis(4-aminocyclohexyl)cycloalkanes such as his(4-aminocyclohexyl)cyclohexane, and also bis(4-aminocyclohexyl)ketone, bis(4-aminocyclohexyl)sulfoxide and 4,4'-diaminodicyclohexyl ether; crosslinked cyclic alkanediamines, including di- or tricyclo($C_{7-10}$ alkane)diamines such as bornanediamine, norbornanediamine and adamantanediamine; and crosslinked cyclic alkenediamines, including di- or tricyclo($C_{7-10}$ alkene)diamines such as bornenediamine and norbornenediamine. These may be used singly or two or more may be used in combination.

Some examples of the aliphatic diamines are alkylenediamines such as tetramethylenediamine, hexamethylenediamine and dodecamethylenediamine. These may be used singly or two or more may be used in combination.

Examples of the acyclic aliphatic polyamines include triethylenetetramine, tetraethylenepentamine and pentaethylenehexamine. These may be used singly or two or more may be used in combination.

With regard to the content of component (D), in order to increase the resilience in particular, it is preferable to add component (D) in an amount corresponding to from 0.01 to 1 mole equivalent per mole equivalent of carboxyl groups in component (A). Here, the term "equivalent" refers to the ratio of the number of amino groups in component (D) to the number of carboxyl groups in component (A), with the carboxyl groups including both those in acid form and those that are ionized.

Component (D) may be used as a component (D)-modified resin ingredient (A), such as an amine-modified ionomer, which is obtained by melt-mixing component (D) beforehand together with the resin ingredient of component (A) at a temperature not lower than the melting point of component (A).

In the golf ball material of the invention, the various types of thermoplastic resins mentioned below may be included in the composition of above components (A) to (D), so long as doing so does not detract from the advantageous effects of the invention. Illustrative examples of thermoplastic resins include, but are not particularly limited to, polyolefin-type elastomers (including polyolefins and metallocene-catalyzed polyolefins), polystyrene-type elastomers, diene-type polymers, polyacrylate-type polymers, polyurethane-type elastomers and polyacetals.

In addition, depending on the intended application, optional additives may be suitably included in the golf ball material of the invention. For example, in cases where the golf ball material of the invention is to be used as a cover stock, various types of additives, such as pigments, dispersants, antioxidants, ultraviolet absorbers and light stabilizers, may be added to above components (A) to (D). When such additives are included, the content thereof per 100 parts by weight of components (A) to (D) combined is preferably at least 0.1 part by weight, and more preferably at least 0.5 part by weight, and is preferably not more than 10 parts by weight, and more preferably not more than 4 parts by weight.

The golf ball material of the invention can be obtained by using any of various types of mixers, such as a kneading type twin-screw extruder, a Banbury mixer, a kneader or a Labo Plastomill, to mix together components (A) to (D). The production extruder may be either a single-screw extruder or a twin-screw extruder, with a twin-screw extruder being more preferred. These extruders may be used in a tandem arrangement, such as single-screw extruder/twin-screw extruder or twin-screw extruder/twin-screw extruder. Such extruders need not be of a special design; the use of an existing extruder suffices.

As mentioned above, component (D)-modified component (A) can be obtained beforehand by mixing together component (A) and component (D) using a melt mixing apparatus such as kneading-type twin-screw extruder or a kneader. In cases where this component (D)-modified component (A) is mixed together with components (B) and (C), use can be made of a method in which these components are charged together into a hopper and extruded under the desired conditions. Alternatively, use can be made of a method in which the respective components are rendered into pellets, and these pellets are charged together into a hopper and dry blended, then extruded under the desired conditions.

This dry blending method enables the desired effects to be achieved using a compatibilizing agent, without the need for a compounding operation in a mixing apparatus such as a kneading type twin-screw extruder, a Banbury mixer, a kneader or an internal mixer such as a Labo Plastomill. That is, sufficient compatibilization can be achieved by injection-molding (which encompasses also film insert molding) a dry blend of the pellets alone, ultimately enabling sufficient durability of the golf ball material to be obtained.

Aside from use as the material for a one-piece golf ball, the golf ball material of the invention may also be used as a cover-forming material in two-piece solid golf balls composed of a core and a cover encased by the core, or as a cover-forming material or an intermediate layer-forming material in multi-piece solid golf balls composed of a core of one or more layer, one or more intermediate layer encasing the core, and a cover of one or more layer encasing the intermediate layer. Particularly in the case of golf balls composed of a core of one or more layer and a cover of one or more layer, the core is formed of a rubber composition that includes cis-1,4-polybutadiene, an unsaturated metal carboxylate, an inorganic filler and an organic peroxide, and the inventive material is preferably used in at least one layer of the cover.

As described above, the golf ball material of the invention helps simplify the golf ball manufacturing operations while at the same time making it possible to provide golf balls of markedly improved durability and rebound.

EXAMPLES

The following Examples and Comparative Examples are provided to illustrate the invention, and are not intended by way of limitation.

Working Examples 1 to 6 Comparative Examples 1 to 12

Solid cores common to each of the Working Examples and the Comparative Examples were obtained using the core-forming composition made up primarily of cis-1,4-polybutadiene shown in Table 1 below.

TABLE 1

| Starting material | Remarks | C1 |
|---|---|---|
| cis-1,4-Polybutadiene | Synthetic rubber "BR01" from JSR Corporation | 80 |
| cis-1,4-Polybutadiene | Synthetic rubber "BR51" from JSR Corporation | 20 |
| Zinc oxide | Sakai Chemical Co. Ltd. | 10.31 |
| Zinc stearate | NOF Corporation | 5 |
| Mono-, di- or tri (α-methylbenzyl)phenol | Antioxidant "Nocrac SP-N" from Ouchi Shinko Chemical Industry Co., Ltd, | 0.1 |
| Zinc salt of pentachlorothiophenol |  | 1 |
| Zinc diacrylate | Nippon Shokubai Co., Ltd, | 31 |
| Dicumyl peroxide | Organic peroxide from NOF Corporation | 0.6 |
| 1,1-(tert-Butylperoxy) cyclohexane | Organic peroxide from NOF Corporation | 0.6 |

Next, the cover materials formulated as shown in Table 2-I and Table 2-II below (cover compositions No. O1 to O18) were obtained by stirring together the respective types of pellets using a dry blending method, following which these cover materials were injection-molded within a temperature range of 160 to 270° C. into molds in which the above solid cores had been placed, thereby producing two-piece solid golf balls having a cover with a thickness of 1.7 mm. In preparing the cover compositions containing component (D), components (A) and (D) were melt-mixed beforehand using a twin-screw extruder at a die temperature of 200° C., and the extruded strand was cut into pellets.

TABLE 2-I

|  |  | Comparative Example | | Example | | Comparative Example | | | Example | Comp. Ex. |
|---|---|---|---|---|---|---|---|---|---|---|
|  |  | 1 | 2 | 1 | 2 | 3 | 4 | 5 | 3 | 6 |
|  | Cover composition | O1 | O2 | O3 | O4 | O5 | O6 | O7 | O8 | O9 |
| Component (A) | Ionomer 1 | 80 | 80 | 80 | 80 | 80 |  |  |  |  |
|  | Ionomer 2 |  |  |  |  |  | 80 | 80 | 80 | 80 |
|  | Ionomer 3 |  |  |  |  |  |  |  |  |  |
| Component (D) | Pentaethylenehexamine |  |  | 0.48 |  |  |  |  | 0.16 | 0.16 |
|  | m-Xylylenediamine |  |  |  | 0.16 | 0.16 |  |  |  |  |
| Component (B) | Hytrel 3046 | 20 | 20 | 20 | 20 | 20 | 20 | 20 | 20 | 20 |
|  | Daiamid E62K2 |  |  |  |  |  |  |  |  |  |
| Component (C) | Compatibilizing agent | 5.26 |  | 5.26 | 5.26 |  | 5.26 |  | 5.26 |  |
|  | Titanium oxide (colorant) | 2.8 | 2.8 | 2.8 | 2.8 | 2.8 | 2.8 | 2.8 | 2.8 | 2.8 |

TABLE 2-II

|  |  | Comparative Example | | Example | | Comparative Example | | | Example | | Comp. Ex. |
|---|---|---|---|---|---|---|---|---|---|---|---|
|  |  | 7 | 8 | 4 | 9 | 10 | 11 | 5 | 6 | 12 |
|  | Cover composition | O10 | O11 | O12 | O13 | O14 | O15 | O16 | O17 | O18 |
| Component (A) | Ionomer 1 |  |  |  |  | 80 | 80 | 80 | 80 | 80 |
|  | Ionomer 2 |  |  |  |  |  |  |  |  |  |
|  | Ionomer 3 | 80 | 80 | 80 | 80 |  |  |  |  |  |
| Component (D) | Pentaethylenehexamine |  |  | 0.16 | 0.16 |  |  | 0.48 |  |  |
|  | m-Xylylenediamine |  |  |  |  |  |  |  | 0.16 | 0.16 |
| Component (B) | Hytrel 3046 | 20 | 20 | 20 | 20 |  |  |  |  |  |
|  | Daiamid E62K2 |  |  |  |  | 20 | 20 | 20 | 20 | 20 |
| Component (C) | Compatibilizing agent | 5.26 |  | 5.26 |  | 5.26 |  | 5.26 | 5.26 |  |
|  | Titanium oxide (colorant) | 2.8 | 2.8 | 2.8 | 2.8 | 2.8 | 2.8 | 2.8 | 2.8 | 2.8 |

Details on the materials in Tables 2-I and 2-II are given below. Numbers shown in the tables for the ingredients included in the cover compositions indicate parts by weight. However, for component (D) only, the numbers shown indicate the equivalents of component (D), i.e., the ratio of the number of amino groups in component (D) to the number of carboxyl groups (including those in acid form and those that are ionized) in component (A).

(1) Ionomer 1: Acid content, 7.5 mol %; neutralizing metal ions, $Zn^{2+}$;
degree of neutralization, 55 mol %
(2) Ionomer 2: Acid content, 7.5 mol %; neutralizing metal ions, $Zn^{2+}$;
degree of neutralization, 40 mol %
(3) Ionomer 3: Acid content, 7.5 mol %; neutralizing metal ions, $Na^+$;
degree of neutralization, 45 mol %
(4) Pentaethylenehexamine (boiling point, 380° C.); available from Tokyo Chemical Industry Co., Ltd.
(5) m-Xylylenediamine (boiling point, 273° C.); available from Mitsubishi Gas Chemical Co., Inc.
(6) Hytrel 3046: A polyester elastomer from DuPont-Toray Co., Ltd.
(7) Daiamid E62K2: A polyamide elastomer available from Daicel-Evonik Ltd.
(8) Compatibilizing agent: A mixture of a functional moiety-containing hydrogenated diene polymer and a functional moiety-containing olefinic polymer, in which the base polymer is polyethylene (PE)/polyethylene terephthalate (PET)

The properties of each of the golf balls obtained in the Working Examples and Comparative Examples were evaluated as described below. The results are presented in Table 3-I and Table 3-II.

Core Diameter

The diameters at five random places on the surface of a core were measured at a temperature of 23.9±1° C., and the average of these measurements was taken as the measured value for one core. The average value was determined for five measured cores.

Ball Diameter

The diameters at 15 random dimple-free places on the surface of a ball were measured at a temperature of 23.9±1° C., and the average of these measurements was taken as the measured value for one ball. The average value was determined for five measured balls.

Deflection of Core and Ball

The object to be measured (core or golf ball) was placed on a steel plate, and the amount of deformation (mm) by the object when compressed under a final load of 1,275 N (130 kgf) from an initial load of 98 N (10 kgf) was measured for each at a temperature of 23.9±1° C.

Initial Velocity

The initial velocities were measured using an initial velocity measuring apparatus of the same type as the USGA drum rotation-type initial velocity instrument approved by the R&A. The core or ball to be tested was held isothermally in a 23.9±1° C. environment for at least 3 hours, then tested in a chamber at a room temperature of 23.9±2° C. Each core or ball was hit using a 250-pound (113.4 kg) head (striking mass) at an impact velocity of 143.8 ft/s (43.83 m/s). One dozen cores or balls were each hit four times and the time taken for the core or ball to traverse a distance of 6.28 ft (1.91 in) was measured and used to compute the initial velocity (m/s). This cycle was carried out over a period of about 15 minutes.

Durability to Cracking

The durability of the golf ball was evaluated using an ADC Ball COR Durability Tester produced by Automated Design Corporation (U.S.). This tester has the function of firing a golf ball pneumatically and causing it to successively strike two metal plates arranged in parallel. The incident velocity against the metal plates was set at 43 m/s. The number of shots required for the golf ball to crack was determined.

TABLE 3-I

|  |  | Comparative Example | | Example | | Comparative Example | | | Example | Comp. Ex. |
|---|---|---|---|---|---|---|---|---|---|---|
|  |  | 1 | 2 | 1 | 2 | 3 | 4 | 5 | 3 | 6 |
| Core | Core composition (type) | C1 | C1 | C1 | C1 | C1 | C1 | C1 | C1 | C1 |
|  | Diameter (mm) | 39.3 | 39.3 | 39.3 | 39.3 | 39.3 | 39.3 | 39.3 | 39.3 | 39.3 |
|  | Weight (g) | 36.9 | 36.9 | 36.9 | 36.9 | 36.9 | 36.9 | 36.9 | 36.9 | 36.9 |
|  | Deflection (mm) | 3.2 | 3.2 | 3.2 | 3.2 | 3.2 | 3.2 | 3.2 | 3.2 | 3.2 |
|  | Initial velocity (m/s) | 78.6 | 78.6 | 78.6 | 78.6 | 78.6 | 78.6 | 78.6 | 78.6 | 78.6 |
| Cover | Composition (type) | O1 | O2 | O3 | O4 | O5 | O6 | O7 | O8 | O9 |
|  | Thickness (mm) | 1.7 | 1.7 | 1.7 | 1.7 | 1.7 | 1.7 | 1.7 | 1.7 | 1.7 |
| Finished ball | Diameter (mm) | 42.7 | 42.7 | 42.7 | 42.7 | 42.7 | 42.7 | 42.7 | 42.7 | 42.7 |
|  | Weight (g) | 45.5 | 45.5 | 45.5 | 45.5 | 45.5 | 45.5 | 45.5 | 45.5 | 45.5 |
|  | Deflection (mm) | 2.3 | 2.3 | 2.2 | 2.2 | 2.2 | 2.3 | 2.3 | 2.2 | 2.2 |
|  | Initial velocity (m/s) | 77.30 | 77.30 | 77.45 | 77.45 | 77.40 | 77.30 | 77.30 | 77.50 | 77.45 |
|  | Durability to cracking (number of shots) | 205 | 6 | 180 | 180 | 79 | 210 | 6 | 160 | 73 |

TABLE 3-II

|  |  | Comparative Example | | Example | Comparative Example | | | Example | | Comp. Ex. |
|---|---|---|---|---|---|---|---|---|---|---|
|  |  | 7 | 8 | 4 | 9 | 10 | 11 | 5 | 6 | 12 |
| Core | Core composition (type) | C1 | C1 | C1 | C1 | C1 | C1 | C1 | C1 | C1 |
|  | Diameter (mm) | 39.3 | 39.3 | 39.3 | 39.3 | 39.3 | 39.3 | 39.3 | 39.3 | 39.3 |
|  | Weight (g) | 36.9 | 36.9 | 36.9 | 36.9 | 36.9 | 36.9 | 36.9 | 36.9 | 36.9 |

TABLE 3-II-continued

|  |  | Comparative Example 7 | Example 8 | Example 4 | Comparative Example 9 | Comparative Example 10 | Comparative Example 11 | Example 5 | Example 6 | Comp. Ex. 12 |
|---|---|---|---|---|---|---|---|---|---|---|
|  | Deflection (mm) | 3.2 | 3.2 | 3.2 | 3.2 | 3.2 | 3.2 | 3.2 | 3.2 | 3.2 |
|  | Initial velocity (m/s) | 78.6 | 78.6 | 78.6 | 78.6 | 78.6 | 78.6 | 78.6 | 78.6 | 78.6 |
| Cover | Composition (type) | O10 | O11 | O12 | O13 | O14 | O15 | O16 | O17 | O18 |
|  | Thickness (mm) | 1.7 | 1.7 | 1.7 | 1.7 | 1.7 | 1.7 | 1.7 | 1.7 | 1.7 |
| Finished ball | Diameter (mm) | 42.7 | 42.7 | 42.7 | 42.7 | 42.7 | 42.7 | 42.7 | 42.7 | 42.7 |
|  | Weight (g) | 45.5 | 45.5 | 45.5 | 45.5 | 45.6 | 45.6 | 45.6 | 45.6 | 45.5 |
|  | Deflection (mm) | 2.3 | 2.3 | 2.3 | 2.3 | 2.3 | 2.3 | 2.2 | 2.2 | 2.2 |
|  | Initial velocity (m/s) | 77.30 | 77.30 | 77.40 | 77.35 | 77.40 | 77.40 | 77.55 | 77.55 | 77.50 |
|  | Durability to cracking (number of shots) | 200 | 5 | 200 | 86 | 190 | 111 | 190 | 180 | 101 |

The results in Tables 3-I and 3-II are discussed below.

The finished balls obtained in Working Examples 1 and 2, in which a diamine ingredient was added as component (D) to the ionomer serving as component (A), have a higher initial velocity and a better rebound than the balls obtained in Comparative Examples 1 and 2, in which a diamine ingredient was not added. Also, it is apparent that in Working Examples 1 and 2, in which a compatibilizing agent was added as component (C), the balls have a better durability than in Comparative Example 3, in which a compatibilizing agent was not added.

The finished ball obtained in Working Example 3, in which a diamine ingredient (here and below, component (D)) was added to the ionomer (here and below, component (A)), has a higher initial velocity and a better rebound that the balls obtained in Comparative Examples 4 and 5, in which a diamine ingredient was not added. Also, it is apparent that in Working Example 3, in which a compatibilizing agent (here and below, component (C)) was added, the ball has a better durability than in Comparative Example 6, in which a compatibilizing agent was not added.

The finished ball obtained in Working Example 4, in which a diamine ingredient was added to the ionomer, has a higher initial velocity and a better rebound than the balls obtained in Comparative Examples 7 and 8, in which a diamine ingredient was not added. Also, it is apparent that in Working Example 4, in which a compatibilizing agent was added, the ball has a better durability than in Comparative Example 9, in which a compatibilizing agent was not added.

The finished balls obtained in Working Examples 5 and 6, in which a diamine ingredient was added to the ionomer, have higher initial velocities and better rebounds than the balls obtained in Comparative Examples 10 and 11, in which a diamine ingredient was not added. Also, it is apparent that in Working Examples 5 and 6, in which a compatibilizing agent was added, the balls have a better durability than in Comparative Example 12, in which a compatibilizing agent was not added.

The invention claimed is:

1. A golf ball material comprising
(A) one, two or more resin ingredients selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers and metal ion neutralization products of olefin-unsaturated carboxylic acid-unsaturated carboxylic acid ester random copolymers;
(D) an amino compound having at least 2 amino groups per molecule;
(B) polyamide elastomers; and
(C) an agent for compatibilizing components (A) and (B), wherein the compatibilizing agent (C) comprises:
(C-i) two kinds of base polymer selected from the group consisting of olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, polyethylene, polyesters and polyamide elastomers,
(C-ii) a hydrogenated diene polymer having at least one type of functional moiety selected from the group consisting of carboxyl, acid anhydride, (meth)acryloyl, amino, alkoxysilyl, hydroxyl, isocyanato and oxazoline moieties, and
(C-iii) an olefinic polymer having at least one type of functional moiety selected from the group consisting of carboxyl, acid anhydride, epoxy, (meth)acryloyl, amino, alkoxysilyl, hydroxyl, isocyanato and oxazoline moieties,
wherein components (A) and (B) are included in a weight ratio therebetween of from 95:5 to 5:95.

2. The golf ball material of claim 1, wherein the content of component (C) is from 2 to 15 parts by weight per 100 parts by weight of the combined amount of components (A) and (B).

3. The golf ball material of claim 1, wherein the base polymer of component (C-i) consists of a combination of a polyethylene and a polyester.

4. The golf ball material of claim 3, wherein the polyester is polyethylene terephthalate.

5. A golf ball comprising a core of one or more layer and a cover of one or more layer, wherein at least one constituent part of the core or the cover or both is made of the golf ball material of claim 1.

* * * * *